United States Patent
Park et al.

(10) Patent No.: US 9,250,376 B2
(45) Date of Patent: Feb. 2, 2016

(54) TRANSPARENT DISPLAY DEVICE INCLUDING A LIGHT GUIDE PLATE HAVING LIGHT SOURCES AT BOTH LATERAL SURFACES AND FORMED WITH A PLURALITY OF CONCAVE PATTERNS AT THE LOWER SURFACE THEREOF

(71) Applicant: LG DISPLAY CO., LTD., Seoul (KR)

(72) Inventors: Se-Hong Park, Goyang (KR); Jong-Sin Park, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/458,956

(22) Filed: Aug. 13, 2014

(65) Prior Publication Data

US 2014/0347606 A1    Nov. 27, 2014

Related U.S. Application Data

(62) Division of application No. 12/836,352, filed on Jul. 14, 2010, now Pat. No. 8,836,889.

(30) Foreign Application Priority Data

Jul. 15, 2009    (KR) .................. 10-2009-0064664

(51) Int. Cl.
G02F 1/1335    (2006.01)
F21V 8/00      (2006.01)

(52) U.S. Cl.
CPC ............ G02B 6/0023 (2013.01); G02B 6/0036 (2013.01); G02B 6/0046 (2013.01); G02B 6/0056 (2013.01); G02F 1/133615 (2013.01)

(58) Field of Classification Search
USPC ............................................. 349/96
See application file for complete search history.

(56) References Cited

U.S. PATENT DOCUMENTS

| 6,086,212 A * | 7/2000 | Onishi et al. .................. 362/621 |
| 2002/0085368 A1 | 7/2002 | Taniguchi et al. |
| 2008/0205084 A1 | 8/2008 | Chen et al. |
| 2009/0147537 A1 * | 6/2009 | Iwasaki ......................... 362/620 |
| 2009/0279324 A1 * | 11/2009 | Chen et al. .................... 362/616 |

FOREIGN PATENT DOCUMENTS

| JP | 2004-325907 A | 11/2004 |
| KR | 10-2001-0016745 A | 3/2001 |
| KR | 10-0414882 B1 | 12/2003 |
| KR | 10-2004-0061959 A | 7/2004 |
| KR | 10-2007-0102264 A | 10/2007 |
| KR | 10-2008-0001775 A | 1/2008 |
| KR | 10-2008-0010173 A | 1/2008 |

* cited by examiner

Primary Examiner — Lauren Nguyen
(74) Attorney, Agent, or Firm — Dentons US LLP

(57) ABSTRACT

Disclosed is a transparent display device including a light guide plate formed with a plurality of concave patterns at the lower surface thereof to totally reflect polarized light entered in a lateral direction while transmitting natural light entered from a lower direction therethrough; a light source disposed in a lateral direction of the light guide plate to emit visible light including first and second polarized lights; a first polarizing plate disposed at a lateral portion of the light guide plate to transmit either one of the first and second polarized lights through the light guide plate; a liquid crystal panel for driving liquid crystals to change the phase of the polarized light; and a second polarizing plate for controlling an amount of the polarized light according to the changed phase of the polarized light.

12 Claims, 7 Drawing Sheets

TRANSPARENT DISPLAY DEVICE INCLUDING A LIGHT GUIDE PLATE HAVING LIGHT SOURCES AT BOTH LATERAL SURFACES AND FORMED WITH A PLURALITY OF CONCAVE PATTERNS AT THE LOWER SURFACE THEREOF

CROSS-REFERENCE TO RELATED APPLICATIONS

This application is a divisional, and claims priority to, U.S. Patent Application No. 12/836,352 filed Jul. 14, 2010, which claims priority to Korean Application No. 10-2009- 0064664 filed Jul. 15, 2009, both of which are incorporated by reference for all purposes as if fully set forth herein.

BACKGROUND OF THE INVENTION

1. Field of the Invention

The present invention relates to a display device, and more particularly, to a transparent display device having a liquid crystal panel.

2. Description of the Related Art

In recent years, studies on transparent display devices for allowing rear objects to be seen as well as capable of making a display thereon have been actively carried out.

In general, a transparent display device is capable of making a transparent display in an organic light-emitting panel or plasma panel using spontaneous light emission.

However, such a transparent display is not allowed in a liquid crystal panel incapable of emitting spontaneous light but using backlight. It is because a non-transparent backlight assembly should be provided at a rear surface of the panel and also polarizing plates should be provided respectively at both front and rear surfaces of the liquid crystal panel to control the transmission of light. In particular, in the polarizing plates provided respectively at both front and rear surfaces of the liquid crystal panel, light is transmitted therethrough when liquid crystals are driven in the liquid crystal panel, but light is in a non-transparent state when liquid crystals are not driven, and thus it may be impossible to implement a transparent display.

Such transparent display devices may be applicable to vehicle front glasses or house glasses to provide the user's desired information.

Therefore, the applicability of such transparent display devices is expected to be drastically expanded. In particular, a liquid crystal panel has wide viewing angle, high luminance, high contrast and full color, and thus it is urgently required to develop a transparent display device having a liquid crystal panel.

SUMMARY OF THE INVENTION

The objective of the present invention is to provide a transparent display device capable of implementing a transparent display by removing the polarizing plates and changing the structure of a light guide plate.

In order to accomplish the foregoing objective, a transparent display device according to the present invention is characterized by including a light guide plate formed with a plurality of concave patterns at the lower surface thereof to totally reflect polarized light entered in a lateral direction while transmitting natural light entered from a lower direction therethrough; a light source disposed in a lateral direction of the light guide plate to emit visible light including a first and a second polarized light; a first polarizing plate disposed at a lateral portion of the light guide plate to transmit either one of the first and second polarized lights through the light guide plate; a liquid crystal panel for driving liquid crystals to change the phase of the polarized light; and a second polarizing plate for controlling an amount of the polarized light according to the changed phase of the polarized light.

In order to accomplish the foregoing objective, a transparent display device according to the present invention is characterized by including a light guide plate formed with a plurality of concave patterns at the lower surface thereof having an inclined cross-section to totally reflect polarized light entered in both lateral directions while transmitting natural light entered from a lower direction therethrough; a first and a second light source disposed in both lateral directions of the light guide plate to emit visible light including a first and a second polarized light; a first and a second polarizing plate disposed at both lateral surfaces of the light guide plate to transmit either one of the first and second polarized lights through the light guide plate; a liquid crystal panel for driving liquid crystals to change the phase of the polarized light; and a third polarizing plate for controlling an amount of the polarized light according to the changed phase of the polarized light.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a transparent display device according to a preferred embodiment of the present invention will be described in detail with reference to the accompanying drawings.

Figure 1:
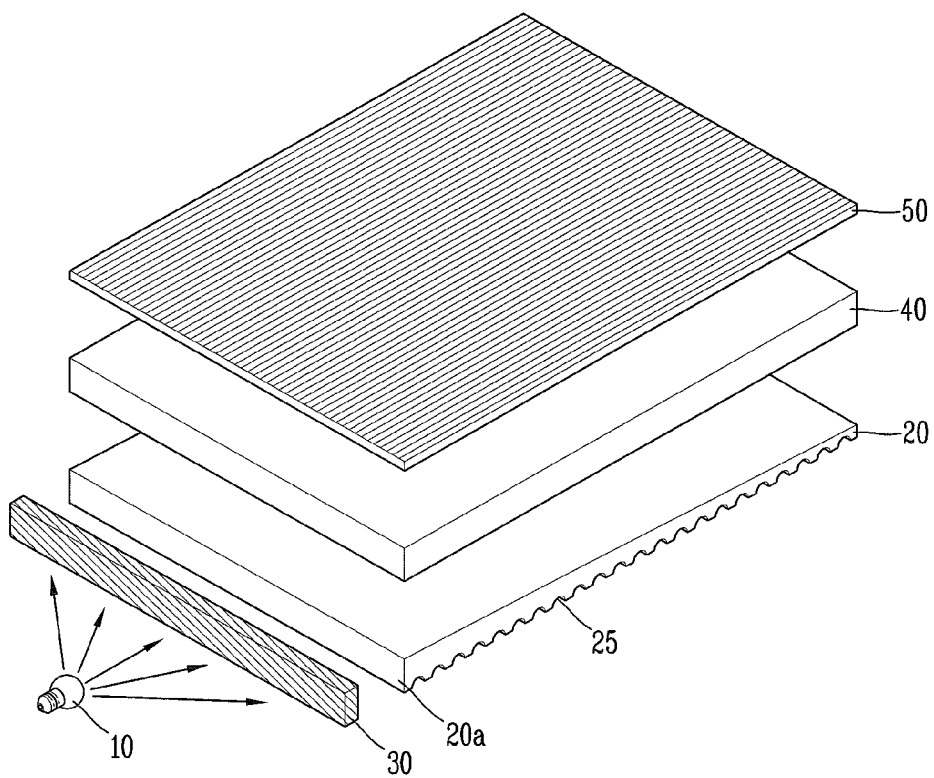
FIG. 1 is a schematic view illustrating a transparent display device according to an embodiment of the present invention.

FIG. 1 is a schematic view illustrating a transparent display device according to an embodiment of the present invention.

Figure 2:
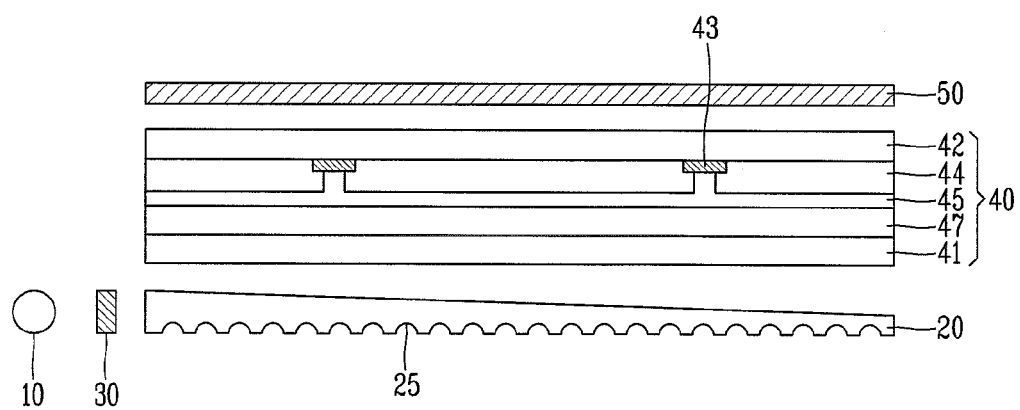
FIG. 2 is a schematic cross-sectional view illustrating a transparent display device according to an embodiment of the present invention.

FIG. 2 is a schematic cross-sectional view illustrating a transparent display device according to an embodiment of the present invention.

Figure 3:
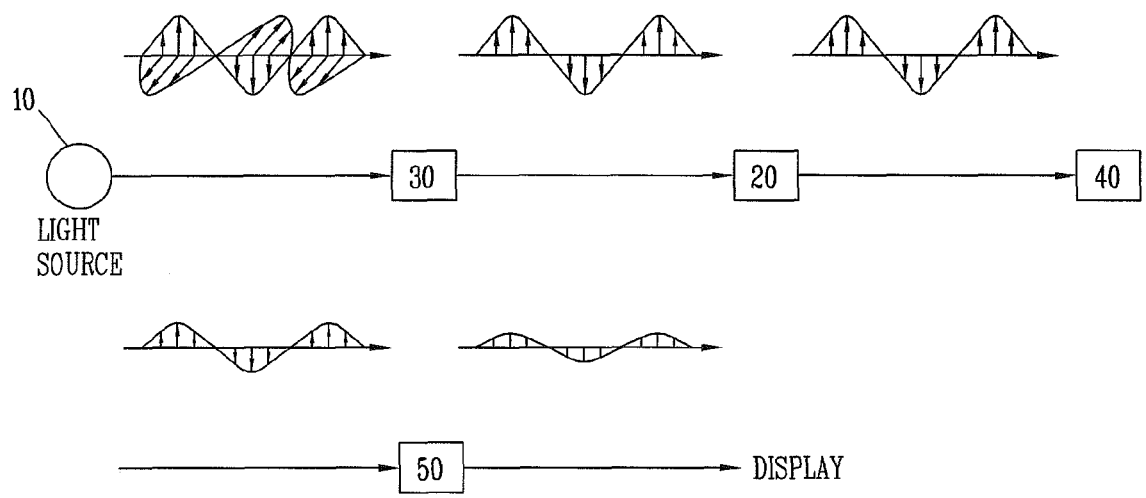
FIG. 3 is a schematic view illustrating the change process of a polarized light generated from a light source of the transparent display device according to an embodiment of the present invention.

FIG. 3 is a schematic view illustrating the change process of a polarized light generated from a light source of the transparent display device according to an embodiment of the present invention.

Figure 4:
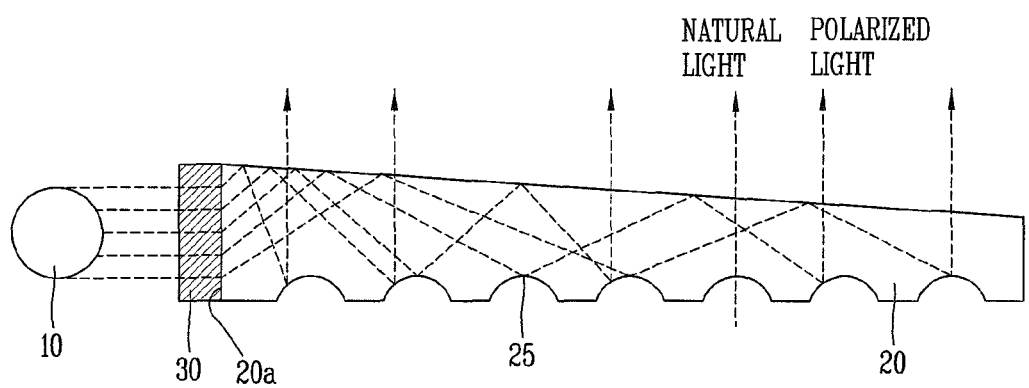
FIG. 4 is a schematic cross-sectional view illustrating a state that the light rays generated from a light source of the transparent display device according to an embodiment of the present invention is polarized through a polarizing plate and a light guide plate.

FIG. 4 is a schematic cross-sectional view illustrating a state that the light rays generated from a light source of the transparent display device according to an embodiment of the present invention is polarized through a polarizing plate and a light guide plate.

Figure 5:
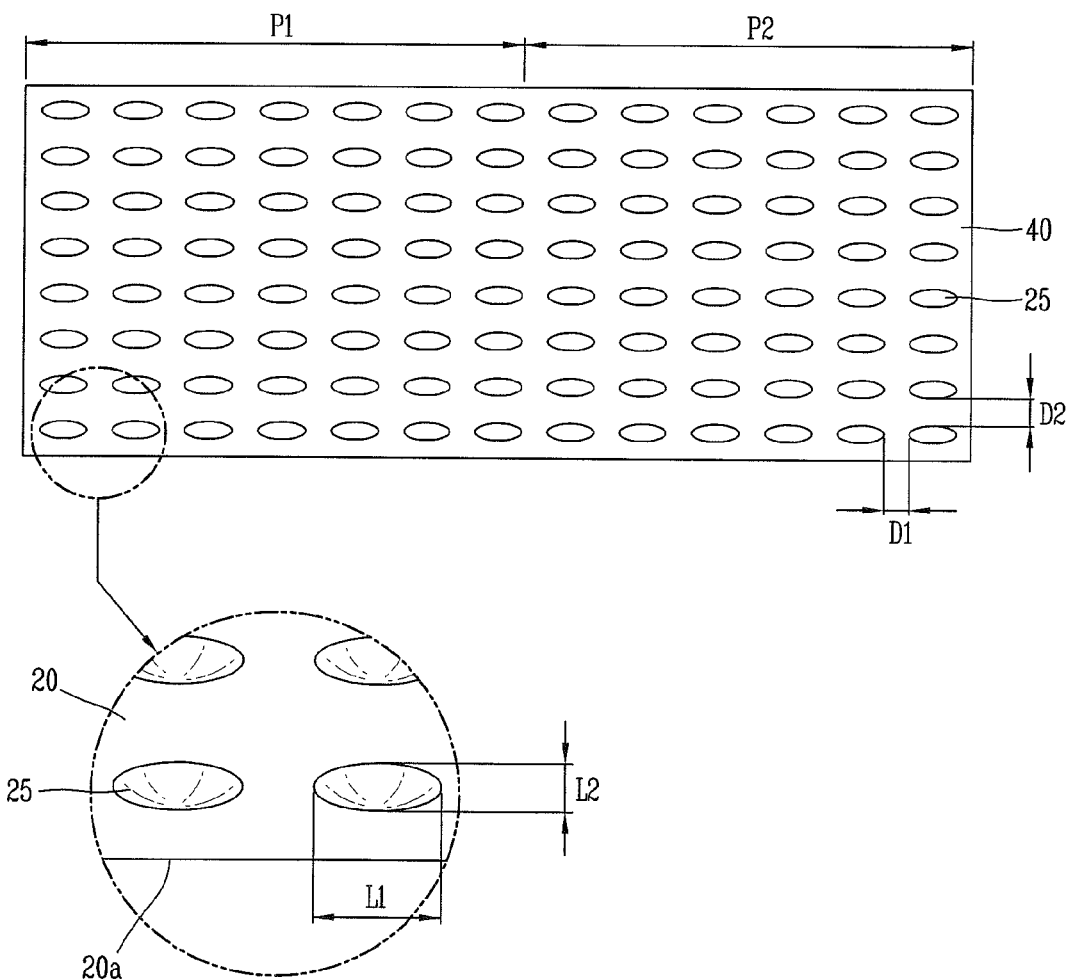
FIG. 5 is a schematic plan view illustrating concave patterns formed at a lower surface of the light guide plate of the transparent display device according to an embodiment of the present invention.

FIG. 5 is a schematic plan view illustrating concave patterns formed at a lower surface of the light guide plate of the transparent display device according to an embodiment of the present invention.

Referring to FIGS. 1 and 2, a transparent display device according to an embodiment of the present invention may be configured by including a light source 10 for generating light, a first polarizing plate 30 for polarizing the light generated from the light source, a light guide plate 20 for outputting polarized light entered through the first polarizing plate 30 to the front surface thereof, and a liquid crystal panel 40 and a second polarizing plate 50 for making a display by the light outputted to the front surface through the light guide plate 20.

Here, referring to FIG. 2, the liquid crystal panel 40 may be configured by including a first substrate 41 having a thin-film transistor (not shown) which is a switching device and a pixel electrode electrically connected to the thin-film transistor; a second substrate 42 having a black matrix 43 formed at the upper surface thereof with regular intervals to block light coming from the light source, a color filter pattern 44 formed in a region between the black matrices 43, and an overcoat layer 45 formed on the color filter patterns 44; and a liquid crystal layer 47 inserted between the first substrate 41 and the second substrate 42.

On the other hand, the light source 10 is disposed to face a light incident surface 20a located at a side of the light guide plate 20. The light source 10 may be a lamp, such as a cold cathode fluorescence (CCFL) and external electrode fluorescence lamp (EEFL), or a light-emitting diode array. At this time, the light-emitting diode array may be configured with a red light-emitting diode, a green light-emitting diode, and blue light-emitting diode, or a plurality of white light-emitting diodes.

Furthermore, the light emitted from the light source 10 may include a first polarized light (vertical polarized light) and a second polarized light (horizontal polarized light).

In addition, the first polarizing plate 30 is disposed to adjoin and face the light incident surface 20a located at a side of the light guide plate 20. In other words, the first polarizing plate 30 is disposed between the light source 10 and the light incident surface 20a of the light guide plate 20. At this time, the first polarizing plate 30 transmits only the first polarized light from the light including the first polarized light and the second polarized light therethrough.

If the light emitted from the light source 10 is entered to the first polarizing plate 30, then only the first polarized light from the light is transmitted by the first polarizing plate 30.

The light guide plate 20 allows the first polarized light passed through the first polarizing plate 30 to be entered into the liquid crystal panel 40 at the front side.

On the other hand, referring to FIG. 3, the light emitted from the light source 10 may include a first and a second polarized light, and only the first polarized light is passed through the first polarizing plate 30, and the first polarized light is entered into the liquid crystal panel 40 through the light guide plate 20, and a phase difference of the first polarized light is changed by driving liquid crystals in the liquid crystal panel 40, and the amount of light passed through the second polarizing plate 50 is changed depending on the changed level of the phase difference to express the gradation.

Moreover, natural light coming from a lower direction of the light guide plate 20 is passed through the second polarizing plate 50 regardless of driving the liquid crystal panel 40, thereby allowing the user to see an object at a lower portion of the light guide plate 20 regardless of making a display.

Accordingly, light prior to entering into the light guide plate 20 is polarized, thereby implementing a display using the polarized light while maintaining a transparent state using natural light coming from a lower direction of the light guide plate 20. At this time, for a light source of the present invention, natural light entered from a lateral direction of the light guide plate 20 may be used as a light source of the present invention, and polarized light emitted by an indoor lamp may be also used.

On the other hand, it is difficult for the light guide plate 20 to uniformly distribute light over an overall surface thereof as located away from the light source 10, and thus the thickness of the light guide plate 20 becomes smaller as located away from the light source 10.

Furthermore, as illustrated in FIGS. 4 and 5, the light guide plate 20 is formed with a plurality of concave patterns 25 to make a uniform surface light source by scattering the light at the lower surface thereof. At this time, the plurality of concave patterns 25 are formed by performing laser irradiation at a lower surface of the light guide plate 20 using a separate mask (not shown) defined by the same pattern shape as the concave patterns. At this time, irradiation energy, irradiation time, and the like when performing laser irradiation may be applied differently depending on the size or kind of the product. The transparency and luminance of the plurality of concave patterns 25 may vary depending on the size and interval of the patterns, and thus it is required to properly adjust the size and interval of the patterns. Alternatively, the concave patterns 25 may be formed using a method such as ruggedness, etching, printing, and the like, as well as laser irradiation.

Referring to FIG. 5, it is designed such that a distance (D1) between the left and right concave patterns 25 adjacent to each other in a horizontal direction (namely, X-direction) of the plurality of concave patterns 25 is 50-350 μm, and a distance (D2) between the upper and lower concave patterns 25 adjacent to each other in a vertical direction (namely, Y-direction) is 50-350 μm. At this time, it is preferably designed such that a distance (D1) between the left and right concave patterns 25 adjacent to each other in the horizontal direction (namely, X-direction) is about 150-250 μm, and a distance (D2) between the upper and lower concave patterns 25 adjacent to each other in the vertical direction (namely, Y-direction) is about 80-150 μm. On the other hand, it is more preferably designed such that a distance (D1) between the left and right concave patterns 25 adjacent to each other in the horizontal direction (namely, X-direction) is about 200-230 μm, and a distance (D2) between the upper and lower concave patterns 25 adjacent to each other in the vertical direction (namely, Y-direction) is about 90-120 μm.

At this time, the intervals (D1, D2) between the concave patterns 25 formed in a second region (P2) of the plurality of concave patterns 25 located away from the light source 10 on the basis of a central portion of the light guide plate 20 are formed narrower than the intervals (D1, D2) between the concave patterns 25 formed in a first region (P1) thereof near to the light source 10. The intervals (D1, D2) between the concave patterns 25 are formed narrower because the second region (P2) of the light guide plate 20 is located away from the light source 10, thereby allowing the light generated from the light source 10 to be easily reached.

In addition, the plurality of concave patterns 25 are formed with a oval-shaped structure, and the concave patterns 25 are 50-350 μm in horizontal length (L1) and 50-300 μm in vertical length (L2). At this time, it is preferably designed such that a size of the concave patterns 25 formed in the first region (P1) of the plurality of concave patterns 25 which is located near to the light source 10 on the basis of a central portion of the light guide plate 20 is 100-150 μm in horizontal length (L1) and 50-150 μm in vertical length (L2).

Also, it is preferably designed such that a size of the concave patterns 25 formed in the first region (P2) which is located away from the light source 10 on the basis of a central portion of the light guide plate 20 is 100-200 μm in horizontal length (L1) and 50-150 μm in vertical length (L2).

On the other hand, natural light may be entered from a lower surface of the light guide plate 20, and at this time the natural light may be entered to the liquid crystal panel 40 via a portion between the concave patterns 25 of the light guide plate 20. The transparent display device of the invention is capable of maintaining a transparent state regardless of whether or not being displayed by such natural light. Accordingly, an object located at a lower portion of the light guide plate is allowed to be viewed by the user at the front side.

At this time, the liquid crystal panel 40 contains liquid crystals 47, the phase of the first polarized light may be varied by driving liquid crystals. The phase of the first polarized light that can be varied by driving liquid crystals may have a range of 0-90 degrees.

In addition, as described above, natural light is entered to the liquid crystal panel 40 through a lower surface of the light guide plate 20, where in the natural light may include a first polarized light and a second polarized light. Accordingly, both first and second polarized lights of the natural light are entered to the liquid crystal panel 40, and thus the second polarized light of the natural light is passed through the liquid crystal panel 40 when liquid crystals are not driven, and the first polarized light of the natural light is passed through the liquid crystal panel 40 when liquid crystals are driven. As a result, an object located at a lower portion of the light guide plate 20 is allowed to be viewed by the user regardless of driving liquid crystals, namely, making a display.

Furthermore, the second polarizing plate 50 may have an optical axis perpendicular to the first polarizing plate 30. Therefore, the light transmission amount may be controlled depending on the phase of the first polarized light varied by driving liquid crystals. For example, in case where the phase of the first polarized light is 0 degree, then the first polarized light is not passed through the second polarizing plate 50, but a more amount of the first polarized light can be passed through the second polarizing plate 50 as increasing the phase of the first polarized light, and thus it may be possible to obtain more gradation as increasing the amount of the first polarized light.

On the other hand, a transparent display device according to another embodiment of the present invention will be described below with reference to FIGS. 6 through 9.

Figure 6:
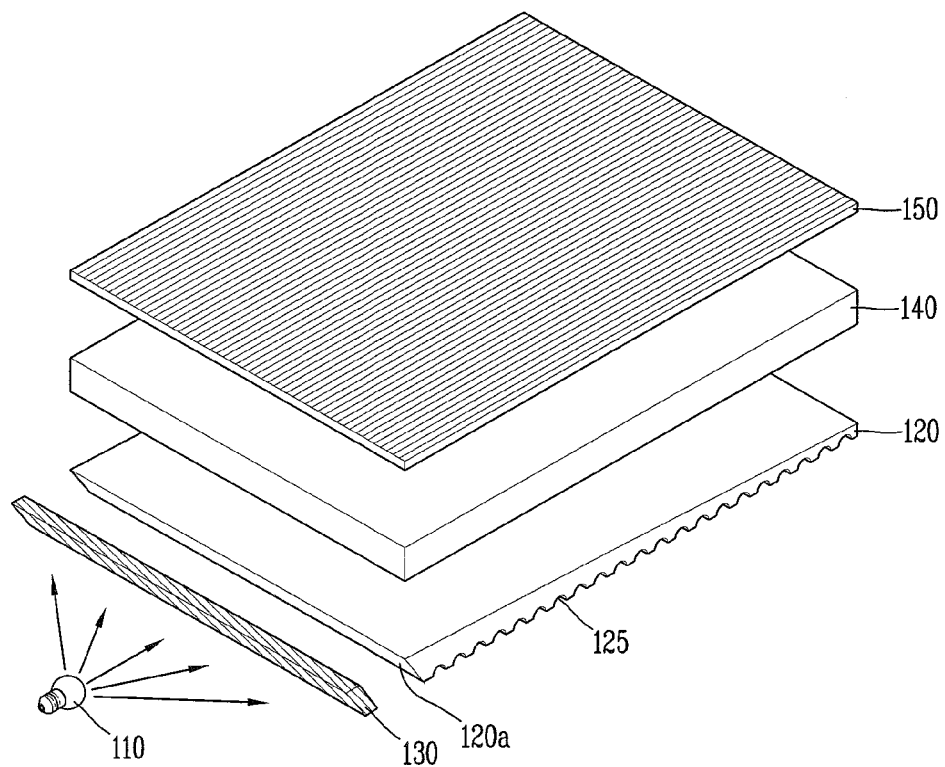
FIG. 6 is a schematic view illustrating a transparent display device according to another embodiment of the present invention.

FIG. 6 is a schematic view illustrating a transparent display device according to another embodiment of the present invention.

Figure 7:
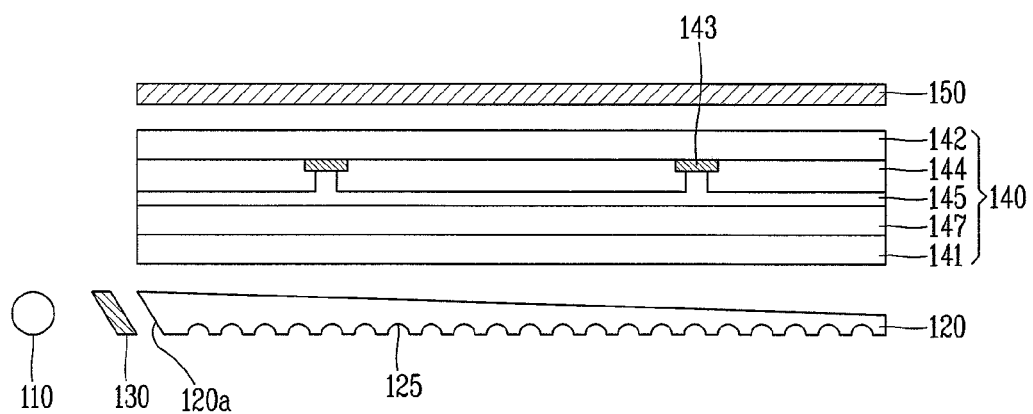
FIG. 7 is a schematic cross-sectional view illustrating a transparent display device according to another embodiment of the present invention.

FIG. 7 is a schematic cross-sectional view illustrating a transparent display device according to another embodiment of the present invention.

Figure 8:
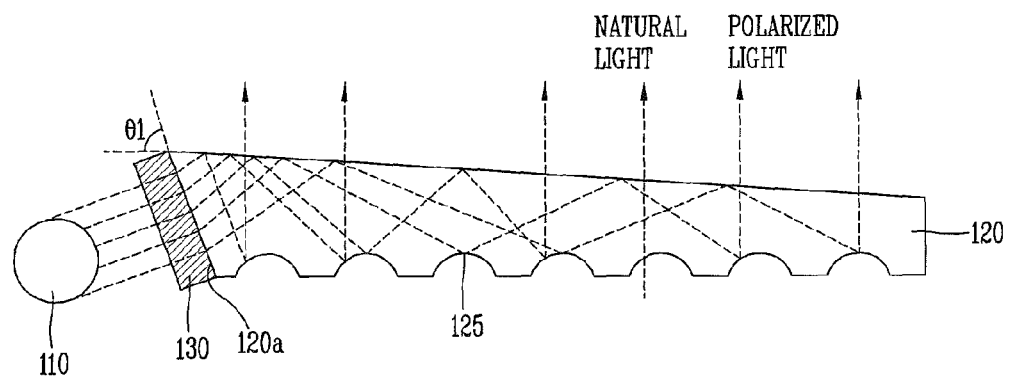
FIG. 8 is a schematic cross-sectional view illustrating a state that the light rays generated from a light source of the transparent display device according to another embodiment of the present invention is polarized through a polarizing plate and a light guide plate.

FIG. 8 is a schematic cross-sectional view illustrating a state that the light rays generated from a light source of the transparent display device according to another embodiment of the present invention is polarized through a polarizing plate and a light guide plate.

Figure 9:
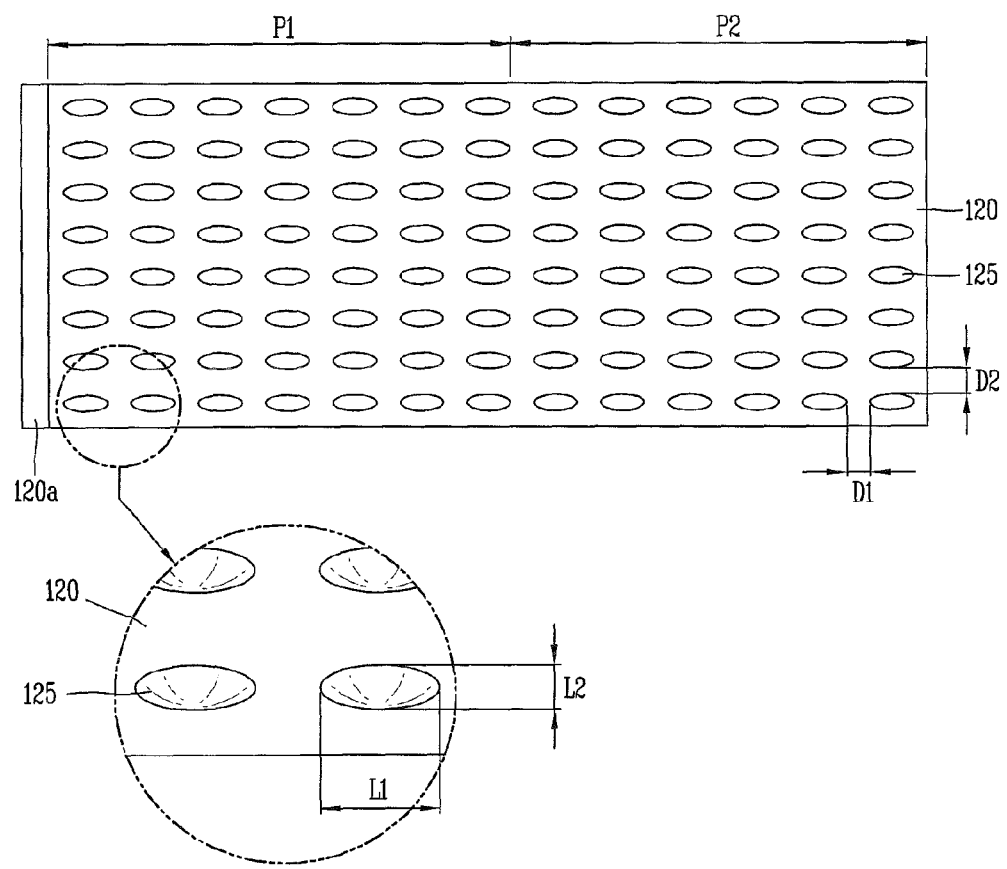
FIG. 9 is a schematic plan view illustrating concave patterns formed at a lower surface of the light guide plate of the transparent display device according to another embodiment of the present invention.

FIG. 9 is a schematic plan view illustrating concave patterns formed at a lower surface of the light guide plate of the transparent display device according to another embodiment of the present invention.

Referring to FIGS. 6 and 7, a transparent display device according to another embodiment of the present invention may be configured by including a light source 110 for generating light, a first polarizing plate 130 for polarizing the light generated from the light source, a light guide plate 120 for outputting polarized light entered through the first polarizing plate 130 to the front surface thereof, and a liquid crystal panel 140 and a second polarizing plate 150 for making a display by the light outputted to the front surface through the light guide plate 120.

Here, referring to FIG. 7, the liquid crystal panel 140 may be configured by including a first substrate 141 having a thin-film transistor (not shown) which is a switching device and a pixel electrode electrically connected to the thin-film transistor; a second substrate 142 having a black matrix 143 formed at the upper surface thereof with regular intervals to block light coming from the light source, a color filter pattern 144 formed in a region between the black matrices 143, and an overcoat layer 145 formed on the color filter patterns 144; and a liquid crystal layer 147 inserted between the first substrate 141 and the second substrate 142.

On the other hand, the light source 110 is disposed to face a light incident surface 120a located at a side of the light guide plate 120. The light source 110 may be a lamp, such as a cold cathode fluorescence (CCFL) and external electrode fluorescence lamp (EEFL), or a light-emitting diode array. At this time, the light-emitting diode array may be configured with a red light-emitting diode, a green light-emitting diode, and blue light-emitting diode, or a plurality of white light-emitting diodes.

Furthermore, the light emitted from the light source 110 may include a first polarized light (vertical polarized light) and a second polarized light (horizontal polarized light).

In addition, the first polarizing plate 130 is disposed to adjoin and face the light incident surface 120a located at a side of the light guide plate 120 and inclined by a predetermined angle (θ1). In other words, the first polarizing plate 130 is disposed between the light source 110 and the light incident surface 120a of the light guide plate 120. At this time, the first polarizing plate 130 transmits only the first polarized light from the light including the first polarized light and the second polarized light therethrough. The inclined angle (θ1) of the light guide plate 120 has a range of about 35-55 degrees. At this time, it is preferable that the inclined angle (θ1) of the light guide plate 120 has a range of about 40-50 degrees.

If the light emitted from the light source 110 is entered to the first polarizing plate 130, then only the first polarized light from the light is transmitted by the first polarizing plate 130.

The light guide plate 120 allows the first polarized light passed through the first polarizing plate 130 to be entered into the liquid crystal panel 140 at the front side.

On the other hand, the light emitted from the light source 110 may include a first and a second polarized light, and only the first polarized light is passed through the first polarizing plate 130, and the first polarized light is entered into the liquid crystal panel 140 through the light guide plate 120, and a phase difference of the first polarized light is changed by driving liquid crystals in the liquid crystal panel 140, and the amount of light passed through the second polarizing plate 150 is changed depending on the changed level of the phase difference to express the gradation.

Moreover, natural light coming from a lower direction of the light guide plate 120 is passed through the second polarizing plate 150 regardless of driving the liquid crystal panel 140, thereby allowing the user to see an object at a lower portion of the light guide plate 120 regardless of making a display.

Accordingly, light prior to entering into the light guide plate 120 is polarized, thereby implementing a display using the polarized light while maintaining a transparent state using natural light coming from a lower direction of the light guide plate 120. At this time, for a light source of the present invention, natural light entered from a lateral direction of the light guide plate 120 may be used as a light source of the present invention, and polarized light emitted by an indoor lamp may be also used.

On the other hand, it is difficult for the light guide plate 120 to uniformly distribute light over an overall surface thereof as located away from the light source 110, and thus the thickness of the light guide plate 120 becomes smaller as located away from the light source 110.

Furthermore, as illustrated in FIGS. 8 and 9, the light guide plate 120 is formed with a plurality of concave patterns 125 to make a uniform surface light source by scattering the light at the lower surface thereof. At this time, the plurality of concave patterns 125 are formed by performing laser irradiation at a lower surface of the light guide plate 120 using a separate mask (not shown) defined by the same pattern shape as the concave patterns. At this time, irradiation energy, irradiation time, and the like when performing laser irradiation may be applied differently depending on the size or kind of the product. The transparency and luminance of the plurality of concave patterns 125 may vary depending on the size and interval of the patterns, and thus it is required to properly adjust the size and interval of the patterns.

Referring to FIG. 9, it is designed such that a distance (D1) between the left and right concave patterns 125 adjacent to each other in a horizontal direction (namely, X-direction) of the plurality of concave patterns 125 is 50-350 μm, and a distance (D2) between the upper and lower concave patterns 125 adjacent to each other in a vertical direction (namely, Y-direction) is 50-350 μm. At this time, it is preferably designed such that a distance (D1) between the left and right concave patterns 125 adjacent to each other in the horizontal direction (namely, X-direction) is about 150-250 μm, and a distance (D2) between the upper and lower concave patterns 125 adjacent to each other in the vertical direction (namely, Y-direction) is about 80-150 μm. On the other hand, it is more preferably designed such that a distance (D1) between the left and right concave patterns 125 adjacent to each other in the horizontal direction (namely, X-direction) is about 200-230 μm, and a distance (D2) between the upper and lower concave patterns 125 adjacent to each other in the vertical direction (namely, Y-direction) is about 90-120 μm.

At this time, the intervals (D1, D2) between the concave patterns 125 formed in a second region (P2) of the plurality of concave patterns 125 located away from the light source 110 on the basis of a central portion of the light guide plate 120 are formed narrower than the intervals (D1, D2) between the concave patterns 125 formed in a first region (P1) thereof near to the light source 110. The intervals (D1, D2) between the concave patterns 125 are formed narrower because the second region (P2) of the light guide plate 120 is located away from the light source 110, thereby allowing the light generated from the light source 110 to be easily reached.

In addition, the plurality of concave patterns 125 are formed with a oval-shaped structure, and the concave patterns 125 are 50-350 μm in horizontal length (L1) and 50-300 μm in vertical length (L2). At this time, it is preferably designed such that a size of the concave patterns 125 formed in the first region (P1) of the plurality of concave patterns 125 which is located near to the light source 110 on the basis of a central portion of the light guide plate 120 is 100-150 μm in horizontal length (L1) and 50-150 μm in vertical length (L2).

Also, it is preferably designed such that a size of the concave patterns 125 formed in the first region (P2) which is located away from the light source 110 on the basis of a central portion of the light guide plate 120 is 100-200 μm in horizontal length (L1) and 50-150 μm in vertical length (L2).

On the other hand, natural light may be entered from a lower surface of the light guide plate 120, and at this time the natural light may be entered to the liquid crystal panel 140 via a portion between the concave patterns 125 of the light guide plate 120. The transparent display device of the invention is capable of maintaining a transparent state regardless of whether or not being displayed by such natural light. Accordingly, an object located at a lower portion of the light guide plate is allowed to be viewed by the user at the front side.

At this time, the liquid crystal panel 140 contains liquid crystals 147, the phase of the first polarized light may be varied by driving liquid crystals. The phase of the first polarized light that can be varied by driving liquid crystals may have a range of 0-90 degrees.

In addition, as described above, natural light is entered to the liquid crystal panel 140 through a lower surface of the light guide plate 120, where in the natural light may include a first polarized light and a second polarized light. Accordingly, both first and second polarized lights of the natural light are entered to the liquid crystal panel 140, and thus the second polarized light of the natural light is passed through the liquid crystal panel 140 when liquid crystals are not driven, and the first polarized light of the natural light is passed through the liquid crystal panel 140 when liquid crystals are driven. As a result, an object located at a lower portion of the light guide plate 120 is allowed to be viewed by the user regardless of driving liquid crystals, namely, making a display.

Furthermore, the second polarizing plate 150 may have an optical axis perpendicular to the first polarizing plate 130. Therefore, the light transmission amount may be controlled depending on the phase of the first polarized light varied by driving liquid crystals. For example, in case where the phase of the first polarized light is 0 degree, then the first polarized light is not passed through the second polarizing plate 150, but a more amount of the first polarized light can be passed through the second polarizing plate 150 as increasing the phase of the first polarized light, and thus it may be possible to obtain more gradation as increasing the amount of the first polarized light.

On the other hand, a transparent display device according to still another embodiment of the present invention will be described below with reference to FIGS. 10 through 13.

Figure 10:
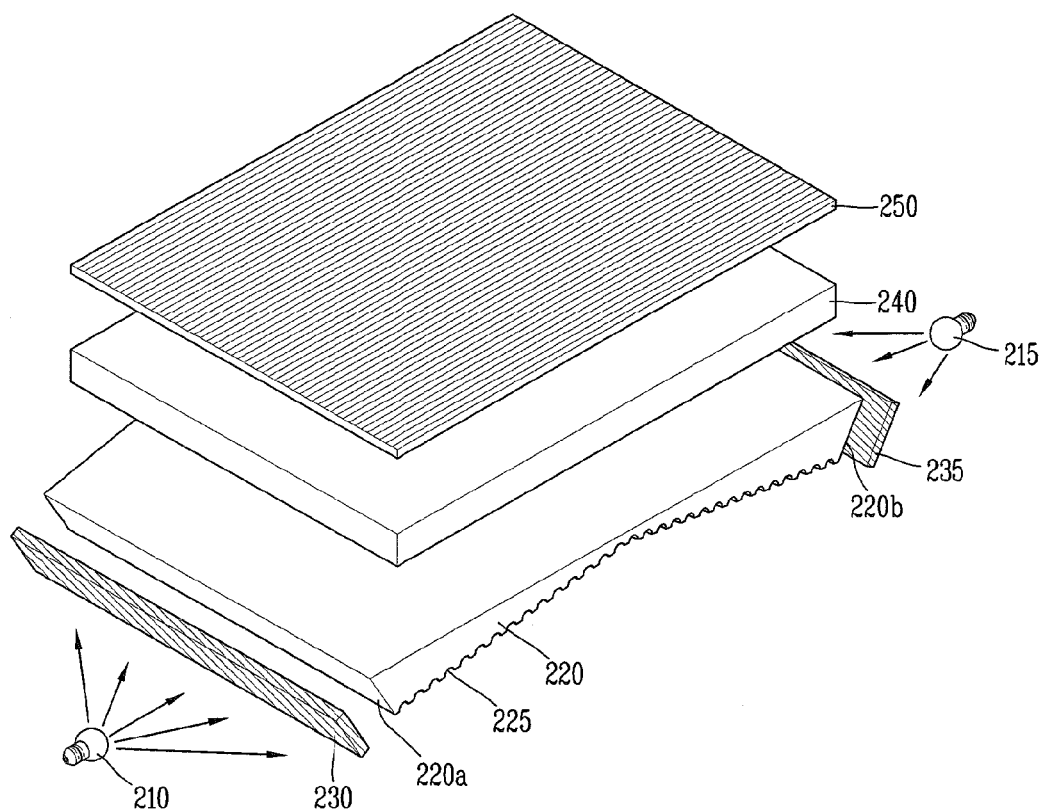
FIG. 10 is a schematic view illustrating a transparent display device according to still another embodiment of the present invention.

FIG. 10 is a schematic view illustrating a transparent display device according to still another embodiment of the present invention.

Figure 11:
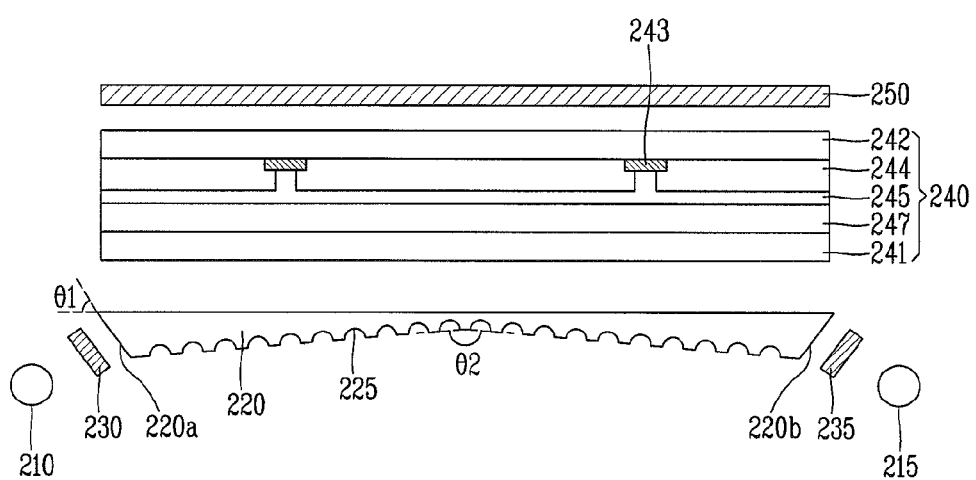
FIG. 11 is a schematic cross-sectional view illustrating a transparent display device according to still another embodiment of the present invention.

FIG. 11 is a schematic cross-sectional view illustrating a transparent display device according to still another embodiment of the present invention.

Figure 12:
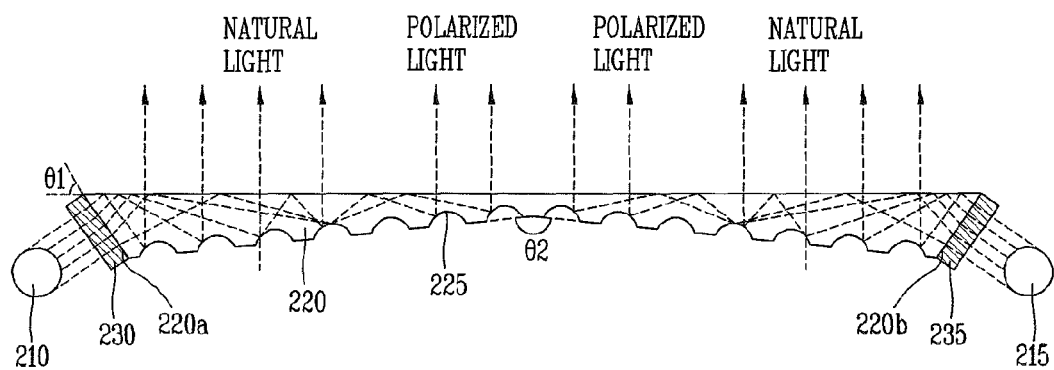
FIG. 12 is a schematic cross-sectional view illustrating a state that the light rays generated from a light source of the transparent display device according to still another embodiment of the present invention is polarized through a polarizing plate and a light guide plate.

FIG. 12 is a schematic cross-sectional view illustrating a state that the light rays generated from a light source of the transparent display device according to still another embodiment of the present invention is polarized through a polarizing plate and a light guide plate.

Figure 13:
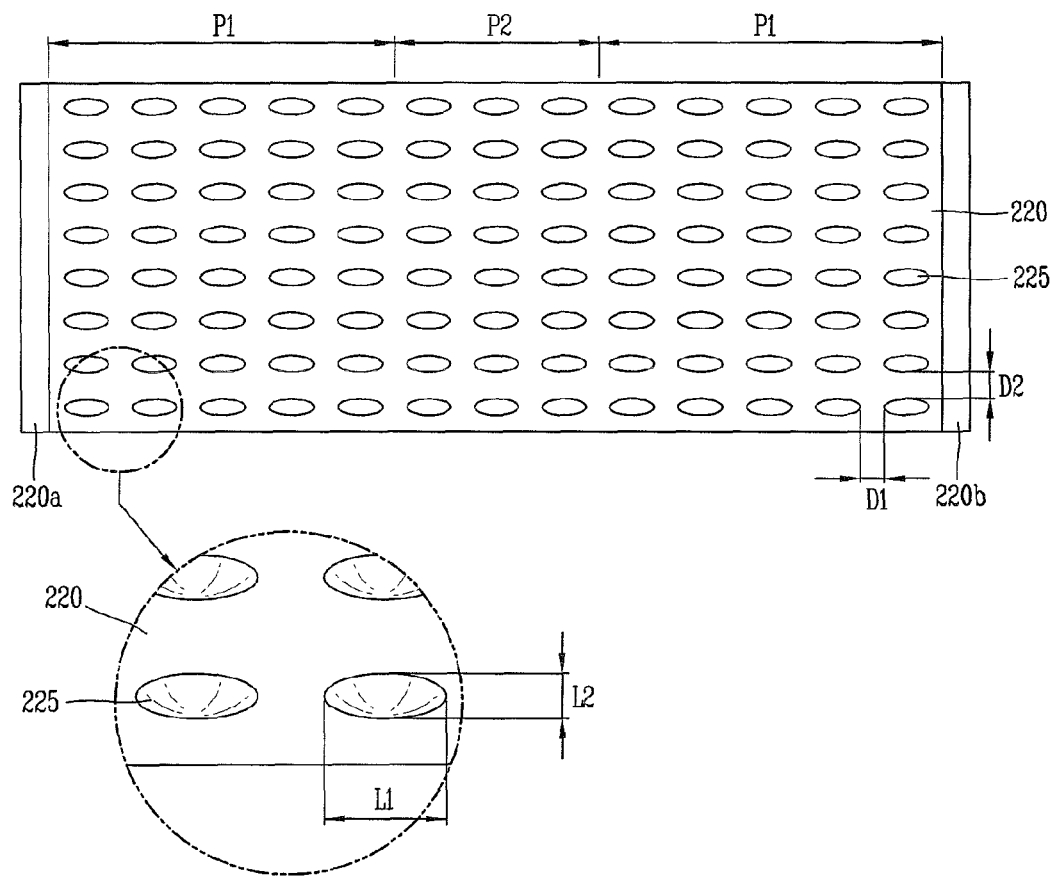
FIG. 13 is a schematic plan view illustrating concave patterns formed at a lower surface of the light guide plate of the transparent display device according to still another embodiment of the present invention.

FIG. 13 is a schematic plan view illustrating concave patterns formed at a lower surface of the light guide plate of the transparent display device according to still another embodiment of the present invention.

Referring to FIGS. 10 and 11, a transparent display device according to still another embodiment of the present invention may be configured by including a light sources 210, 235 for generating light, first polarizing plates 230, 235 for polarizing the light generated from the light sources, a light guide plate 220 for outputting polarized light entered through the first polarizing plates 230, 235 to the front surface thereof, and a liquid crystal panel 240 and a second polarizing plate 250 for making a display by the light outputted to the front surface through the light guide plate 220.

Here, referring to FIG. 11, the liquid crystal panel 240 may be configured by including a first substrate 241 having a thin-film transistor (not shown) which is a switching device and a pixel electrode electrically connected to the thin-film transistor; a second substrate 242 having a black matrix 243 formed at the upper surface thereof with regular intervals to block light coming from the light source, a color filter pattern 244 formed in a region between the black matrices 243, and an overcoat layer 245 formed on the color filter patterns 244; and a liquid crystal layer 247 inserted between the first substrate 241 and the second substrate 242.

On the other hand, the light sources 210, 215 are disposed to face inclined-shaped light incident surfaces 220a, 220b located at both sides of the light guide plate 220. The light sources 210, 215 may be a lamp, such as a cold cathode fluorescence (CCFL) and external electrode fluorescence lamp (EEFL), or a light-emitting diode array. At this time, the light-emitting diode array may be configured with a red light-emitting diode, a green light-emitting diode, and blue light-emitting diode, or a plurality of white light-emitting diodes.

Furthermore, the light emitted from the light sources 210, 215 may include a first polarized light (vertical polarized light) and a second polarized light (horizontal polarized light).

In addition, the first polarizing plates 230, 235 are disposed to adjoin and face the light incident surfaces 220a, 220b located at both sides of the light guide plate 220 and inclined by a predetermined angle ($\theta$1). In other words, the first polarizing plates 230, 235 are disposed between the light sources 210, 215 and the light incident surfaces 220a, 220b of the light guide plate 220. At this time, the first polarizing plates 230, 235 transmit only the first polarized light from the light including the first polarized light and the second polarized light therethrough. The inclined angle ($\theta$1) of the light guide plate 220 has a range of about 35-55 degrees. At this time, it is preferable that the inclined angle ($\theta$1) of the light guide plate 220 has a range of about 40-50 degrees.

If the light emitted from the light sources 210, 215 is entered to the first polarizing plates 230, 235, then only the first polarized light from the light is transmitted by the first polarizing plates 230, 235.

The light guide plate 220 allows the first polarized light passed through the first polarizing plates 230, 235 to be entered into the liquid crystal panel 240 at the front side.

On the other hand, the light emitted from the light sources 210, 215 may include a first and a second polarized light, and only the first polarized light is passed through the first polarizing plates 230, 235, and the first polarized light is entered into the liquid crystal panel 240 through the light guide plate 220, and a phase difference of the first polarized light is changed by driving liquid crystals in the liquid crystal panel 240, and the amount of light passed through the second polarizing plate 250 is changed depending on the changed level of the phase difference to express the gradation.

Moreover, natural light coming from a lower direction of the light guide plate 220 is passed through the second polarizing plate 250 regardless of driving the liquid crystal panel 240, thereby allowing the user to see an object at a lower portion of the light guide plate 220 regardless of making a display.

Accordingly, light prior to entering into the light guide plate 220 is polarized, thereby implementing a display using the polarized light while maintaining a transparent state using natural light coming from a lower direction of the light guide plate 220. At this time, for a light source of the present invention, natural light entered from a lateral direction of the light guide plate 220 may be used as a light source of the present invention, and polarized light emitted by an indoor lamp may be also used.

On the other hand, it is difficult for the light guide plate 220 to uniformly distribute light over an overall surface thereof as located away from the left and right light sources 210, 215, and thus the thickness of the light guide plate 220 becomes smaller as located away from the light sources 210, 215. In other words, the thickness is formed thinner as it goes toward a central portion of the light guide plate 220. In particular, a lower surface of the light guide plate 220 is formed to be inclined and smaller in the thickness as it goes toward a central portion thereof from both sides of the light guide plate. At this time, an inclined angle of the lower central portion of the light guide plate 220 is preferably formed to be smaller than 180 degrees.

Furthermore, as illustrated in FIGS. 12 and 13, the light guide plate 220 is formed with a plurality of concave patterns 225 to make a uniform surface light source by scattering the light at the lower surface thereof. At this time, the plurality of concave patterns 225 are formed by performing laser irradiation at a lower surface of the light guide plate 220 using a separate mask (not shown) defined by the same pattern shape as the concave patterns. At this time, irradiation energy, irradiation time, and the like when performing laser irradiation may be applied differently depending on the size or kind of the product. The transparency and luminance of the plurality of concave patterns 225 may vary depending on the size and interval of the patterns, and thus it is required to properly adjust the size and interval of the patterns.

Referring to FIG. 13, it is designed such that a distance (D1) between the left and right concave patterns 225 adjacent to each other in a horizontal direction (namely, X-direction) of the plurality of concave patterns 225 is 50-350 µm, and a distance (D2) between the upper and lower concave patterns 225 adjacent to each other in a vertical direction (namely, Y-direction) is 50-350 µm. At this time, it is preferably designed such that a distance (D1) between the left and right concave patterns 225 adjacent to each other in the horizontal direction (namely, X-direction) is about 150-250 µm, and a distance (D2) between the upper and lower concave patterns 225 adjacent to each other in the vertical direction (namely, Y-direction) is about 80-150 µm. On the other hand, it is more preferably designed such that a distance (D1) between the left and right concave patterns 225 adjacent to each other in the horizontal direction (namely, X-direction) is about 200-230 µm, and a distance (D2) between the upper and lower concave patterns 225 adjacent to each other in the vertical direction (namely, Y-direction) is about 90-120 µm.

At this time, the intervals (D1, D2) between the concave patterns 225 formed in a second region (P2) of the plurality of concave patterns 225 located away from the light sources 210, 215 on the basis of a central portion of the light guide plate 120 are formed narrower than the intervals (D1, D2) between the concave patterns 225 formed in a first region (P1) thereof near to the light sources 210, 215. The intervals (D1, D2) between the concave patterns 225 are formed narrower because the second region (P2) of the light guide plate 220 is located away from the light sources 210, 215, thereby allowing the light generated from the light sources 210, 215 to be easily reached.

In addition, the plurality of concave patterns 225 are formed with a oval-shaped structure, and the concave patterns 225 are 50-350 µm in horizontal length (L1) and 50-300 µm in vertical length (L2). At this time, it is preferably designed such that a size of the concave patterns 225 formed in the first region (P1) of the plurality of concave patterns 225 which is located near to the light sources 210, 215 on the basis of a central portion of the light guide plate 220 is 100-150 µm in horizontal length (L1) and 50-150 µm in vertical length (L2).

Also, it is preferably designed such that a size of the concave patterns 225 formed in the first region (P2) which is located away from the light sources 210, 215 on the basis of a central portion of the light guide plate 220 is 100-200 µm in horizontal length (L1) and 50-150 µm in vertical length (L2).

On the other hand, natural light may be entered from a lower surface of the light guide plate 220, and at this time the natural light may be entered to the liquid crystal panel 240 via a portion between the concave patterns 225 of the light guide plate 220. The transparent display device of the invention is capable of maintaining a transparent state regardless of whether or not being displayed by such natural light. Accordingly, an object located at a lower portion of the light guide plate is allowed to be viewed by the user at the front side.

At this time, the liquid crystal panel 240 contains liquid crystals 247, the phase of the first polarized light may be varied by driving liquid crystals. The phase of the first polarized light that can be varied by driving liquid crystals may have a range of 0-90 degrees.

In addition, as described above, natural light is entered to the liquid crystal panel 240 through a lower surface of the light guide plate 220, where in the natural light may include a first polarized light and a second polarized light. Accordingly, both first and second polarized lights of the natural light are entered to the liquid crystal panel 240, and thus the second polarized light of the natural light is passed through the liquid crystal panel 240 when liquid crystals are not driven, and the first polarized light of the natural light is passed through the liquid crystal panel 240 when liquid crystals are driven. As a result, an object located at a lower portion of the light guide plate 220 is allowed to be viewed by the user regardless of driving liquid crystals, namely, making a display.

Furthermore, the second polarizing plate 250 may have an optical axis perpendicular to the first polarizing plates 230, 235. Therefore, the light transmission amount may be controlled depending on the phase of the first polarized light varied by driving liquid crystals. For example, in case where the phase of the first polarized light is 0 degree, then the first polarized light is not passed through the second polarizing plate 250, but a more amount of the first polarized light can be passed through the second polarizing plate 250 as increasing the phase of the first polarized light, and thus it may be possible to obtain more gradation as increasing the amount of the first polarized light.

As described above, according to the present invention, a polarizing plate disposed at an upper or lower portion is removed from the polarizing plates that have been disposed at the upper and lower portions of a conventional liquid crystal panel, thereby allowing the implementation of a transparent display even in liquid crystal panels which were formerly considered to be impossible to realize to expand the applicability of such liquid crystal panels.

In addition, according to the present invention, some of the polarizing plates required in the existing liquid crystal display devices and some of materials of the backlight unit (optical sheets, etc.) can be removed, thereby reducing the production cost of a transparent display device.

Although the present invention has been described with reference to the preferred embodiments as illustrated in the drawings, these are merely illustrative, and it should be understood by those skilled in the art that various modifications and equivalent other embodiments of the present invention can be made.

What is claimes is:
1. A transparent display device, comprising:
a light guide plate with a plurality of concave patterns at the lower surface thereof having an inclined cross-section to totally reflect polarized light entered in both lateral directions while transmitting natural light entered from a lower direction therethrough;
a first and a second light source in both lateral directions of the light guide plate to emit visible light including a first and a second polarized light;
a first and a second polarizing plate at both lateral surfaces of the light guide plate to transmit either one of the first and second polarized lights through the light guide plate;
a liquid crystal panel arranged directly above an upper surface of the light guide plate, wherein no polarizer is located between a first substrate of the liquid crystal panel and the light guide plate, and wherein the liquid crystal panel drives liquid crystals to change the phase of the polarized light; and
a third polarizing plate on a second substrate at an upper portion of the liquid crystal panel having a first substrate and the second substrate, the third polarizing plate being arranged to control an amount of the polarized light according to the changed phase of the polarized light.

2. The transparent display device of claim 1, wherein the first and the second light sources are any one of a lamp, a light-emitting diode array, an indoor light, and natural light.

3. The transparent display device of claim 1, wherein the light entered in a lateral direction of the light guide plate is used to make a display, and the natural light entered from a lower direction of the light guide plate is used in a transparent state.

4. The transparent display device of claim 1, wherein the plurality of concave patterns are formed by laser irradiation.

5. The transparent display device of claim 1, wherein a size of the concave patterns formed in a second region of the plurality of concave patterns located at a central portion of the lower surface of the light guide plate to be away from the light sources located at both lateral sides of the light guide plate is formed smaller than that of the concave patterns formed in a first region thereof located adjacent to the light sources located at both lateral sides of the light guide plate.

6. The transparent display device of claim 5, wherein the concave patterns formed in the first region of the plurality of concave patterns are 50-350 μm in horizontal length and 50-300 μm in vertical length, and the concave patterns formed in the second region are 100-200 μm in horizontal length and 50-150 μm in vertical length.

7. The transparent display device of claim 1, wherein a distance (D1) between the left and right concave patterns adjacent to each other in a horizontal direction (X-direction) of the plurality of concave patterns is 50-350 μm, and a distance (D2) between the upper and lower concave patterns adjacent to each other in a vertical direction (Y-direction) is 50-350 μm.

8. The transparent display device of claim 1, wherein intervals between the concave patterns formed in a second region of the plurality of concave patterns located at a central portion of the lower surface of the light guide plate to be away from the light source are formed narrower than intervals between the concave patterns formed in a first region thereof located adjacent to the light sources located at both lateral sides of the light guide plate.

9. The transparent display device of claim 1, wherein the plurality of concave patterns have an oval-shaped structure.

10. The transparent display device of claim 1, wherein the lower surface of the light guide plate is formed to be inclined and the depth thereof is decreased as it goes from both lateral sides of the light guide plate toward the central portion thereof.

11. The transparent display device of claim 10, wherein an inclined angle of the central portion of the lower surface of the light guide plate is less than 180 degrees.

12. The transparent display device of claim 1, wherein inclined-shaped light incident surfaces are located at both sides of the light guide plate.

\* \* \* \* \*